United States Patent [19]

Nohara et al.

[11] Patent Number: 4,816,304

[45] Date of Patent: Mar. 28, 1989

[54] MULTI-LAYER GAS-BARRIER DRAWN POLYESTER VESSEL

[75] Inventors: Shigezo Nohara, Yokohama; Sadao Hirata, Kamakura; Takeshi Sugimoto, Yokohama; Yoshimichi Ohkubo, Fujisawa, all of Japan

[73] Assignee: Toyo Seikan Kaisha, Ltd., Tokyo, Japan

[21] Appl. No.: 8,143

[22] Filed: Jan. 22, 1987

Related U.S. Application Data

[63] Continuation of Ser. No. 767,336, Aug. 21, 1985, abandoned.

[30] Foreign Application Priority Data

Aug. 23, 1984 [JP] Japan ................... 59-174038

[51] Int. Cl.$^4$ .................. B65D 23/00; B29C 49/04
[52] U.S. Cl. ..................... 428/36.7; 264/514; 264/539; 428/475.2; 428/475.8; 428/480
[58] Field of Search ............... 428/35, 480, 483, 355, 428/475 L, 475.8; 264/514, 539

[56] References Cited

U.S. PATENT DOCUMENTS

| | | | |
|---|---|---|---|
| 4,398,642 | 8/1983 | Okudaira et al. | 428/475.2 |
| 4,430,288 | 2/1984 | Bonis | 428/35 |
| 4,528,219 | 7/1985 | Yamada et al. | 428/35 |
| 4,564,541 | 1/1986 | Taira et al. | 428/35 |

*Primary Examiner*—George F. Lesmes
*Assistant Examiner*—James J. Seidleck
*Attorney, Agent, or Firm*—Sherman and Shalloway

[57] ABSTRACT

Disclosed is a multi-layer gas-barrier drawn polyester vessel, which comprises an open end portion, a barrel portion which is molecularly oriented in at least one axial direction and a closed bottom portion, said vessel having inner and outer layers composed of a thermoplastic polyester or copolyester and a gas-barrier intermediate layer composed of an ethylene/vinyl alcohol copolymer having an ethylene content lower than 50 mole %, wherein a copolymer nylon resin or a blend of a plurality of nylon resins is interposed as an adhesive between two adjacent layers.

5 Claims, 1 Drawing Sheet

MULTI-LAYER GAS-BARRIER DRAWN POLYESTER VESSEL

This application is a continuation of application Ser. No. 767,336 filed Aug. 21, 1985, now abandoned.

BACKGROUND OF THE INVENTION

(1) Field of the Invention

The present invention relates to a multi-layer drawn polyester vessel. More particularly, the present invention relates to a gas-barrier vessel comprising a gas-barrier layer composed of an ethylene/vinyl alcohol copolymer and a substrate layer composed of a polyester, in which the vessel wall is molecularly oriented in at least one axial direction by drawing and the interlaminar adhesion is improved.

(2) Description of the Prior Art

Formation of vessels such as drawn polyester bottles is popular at the present. These formed vessels have excellent transparency and appropriate gas-barrier property, and they have been broadly used as vessels for liquid detergents, shampoos, cosmetics, soys and sauces and recently also for carbonated drinks such as beer, cola and soda pop and refreshing drinks such as fruit juices and mineral water.

However, since even drawn polyester bottles are plastic vessels, they have a permeability to oxygen, carbon dioxide gas and the like though the permeability is very small, while the gas permeability of completely sealed vessels such as glass bottles and metal cans is substantially zero. Accordingly, drawn polyester bottles are inferior to cans and glass bottles in the food filling and storing properties, and in case of carbonated drinks, loss of carbon dioxide gas is caused and in case of beer, cola and soda pop, there is a difinite limit of the storage period.

As means for improving the gas barrier property in drawn polyester vessels, there has been practically adopted a method in which a drawn polyester bottle is coated with a polyvinylidene chloride resin. Lamination or coating of a polyester with a resin having a poorer gas-barrier property than that of the polyester is insignificant for improving a drawn polyester resin which has inherently an appropriate gas-barrier property. Namely, a resin which is excellent over a polyester in the gas-barrier property should be used for lamination or coating. As such resin, there can be mentioned thermoplastic resins selected from vinyldiene chloride resins, acrylonitrile type resins and vinyl alcohol type resins. At any rate, an appropriate resin should be selected while the properties and processability of the resin are taken into consideration.

We previously found that in the production of a multi-layer drawn polyester vessel comprising a polyester substrate and a gas-barrier layer of an ethylene/vinyl alcohol copolymer, if the steps of forming a pipe by co-extrusion, cutting the pipe, heat-forming the bottom and biaxially draw-blowing the bottomed tube are combined in this order, a multi-layer drawn polyester vessel having an excellent gas-barrier property and a high molecular orientation can be obtained (see Japanese Patent Application No. 73893/83).

However, since there is no substantial heat bondability between the polyester layer and the ethylene/vinyl alcohol copolymer layer, it is eagerly desired to develop an adhesive resin which can provide such a strong interlaminar bonding between both the layers that the bonded structure can resist falling shocks.

SUMMARY OF THE INVENTION

As the result of our research, it was found that the above problem involved in the production of a multi-layer drawn polyester vessel can be solved by using an ethylene/vinyl alcohol copolymer having an ethylene content lower than 50 mole% for a gas-barrier resin layer, a polyester resin for an inner layer, an outer layer or inner and outer layers as the substrate and a copolymer nylon resin or a blend of a plurality of nylon resins for an adhesive resin layer.

It is therefore a primary object of the present invention to provide a multi-layer vessel in which a gas-barrier layer of an ethylene/vinyl alcohol copolymer and a molecularly oriented polyester copolyester are strongly bonded and this bonding is not influenced by a falling shock, deformation or inner carbon dioxide gas pressure.

Another object of the present invention is to provide a multilayer gas-barrier drawn polyester vessel which is excellent in the interlaminar peeling resistance, gas barrier property and transparency.

More specifically, in accordance with the present invention, there is provided a multi-layer gas-barrier drawn polyester vessel, which comprises an open end portion, a barrier portion which is molecularly oriented in at least one axial direction and a closed bottom portion, said vessel having inner and outer layers composed of a thermoplastic polyester or copolyester and a gas-barrier intermediate layer composed of an ethylene/vinyl alcohol copolymer having an ethylene content lower than 50 mole%, wherein a copolymer nylon resin or a blend of a plurality of nylon resins is interposed as an adhesive between two adjacent layers.

DETAILED DESCRIPTION OF THE PREFERRED EMBODIMENTS

Figure 1:
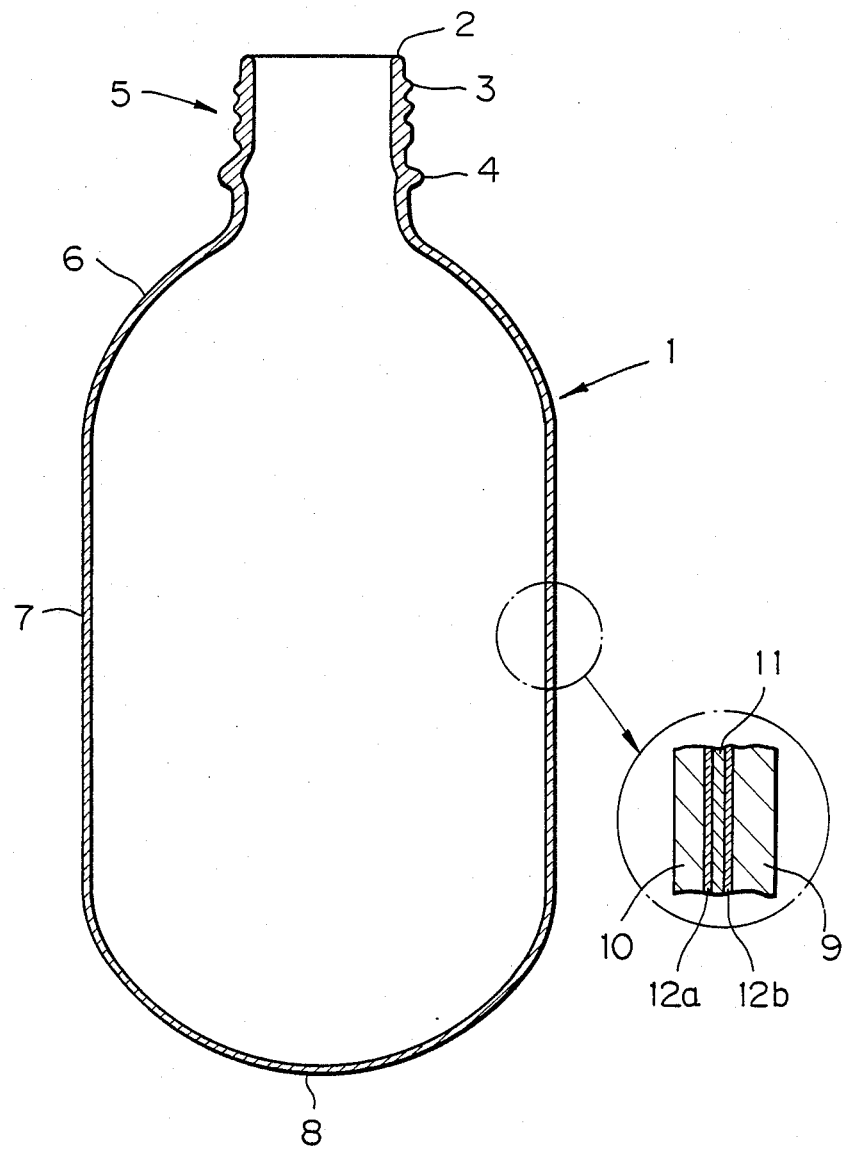
FIG. 1 is a sectional side view illustrating an embodiment of the multi-layer drawn bottle according to the present invention.

A bottle-shaped or cup-shaped vessel comprising a molecularly oriented polyester substrate layer and a gas-barrier layer of an ethylene/vinyl alcohol copolymer is known. A bottle or cup of this structure having an adhesive layer between both the resin layers can be practically used under certain use conditions. However, it is generally impossible to provide a strong interlaminar heat-bonding strength between the polyester layer and ethylene/vinyl alcohol copolymer layer. Accordingly, in the case where no adhesive layer is interposed between both the resin layers, if water or the like is filled and sealed in a bottle or cup and a falling shock or large deformation is given to the vessel or if a carbonated drink is filled and sealed in such a vessel, interlaminar peeling is readily caused between the polyester layer and ethylene/vinyl alcohol copolymer layer.

The critical feature of the present invention resides in the finding that if a copolymer nylon resin or a blend of a plurality of nylon resins is interposed between the above-mentioned two resin layers to provide a bonding force between both the resin layers, when various deformations are given or when a carbonated drink is filled and sealed, interlaminar peeling is not caused and the multi-layer vessel shows a complete gas-barrier property, and even if this adhesive is interposed between the two resin layers, the transparency is not degraded but maintained at a high level.

Although an amide group-containing thermoplastic resin such as a polyamide is known as a resin material constituting a multi-layer vessel, it is not known that a copolymer nylon resin or nylon resin blend as used in the present invention can be interposed between a polyester layer and an ethylene/vinyl alcohol copolymer layer or that this copolymer nylon resin or nylon resin blend has an excellent bondability to the two layers and exerts the above-mentioned functional effects.

The present invention will now be described in detail with reference to the accompanying drawings.

Structure of Vessel

Referring to FIG. 1 illustrating an embodiment (bottle) of the multi-layer polyester vessel according to the present invention, this bottle 1 comprises a neck portion 5 having an opening 2 on the top end and lid-engaging, screw and anchoring parts, such as a screw 3 and a support 4, on the periphery, a barrel portion 7 connected to the neck portion 5 through a shoulder portion 6 and a closed bottom portion 8. The barrel portion 7 of this bottle 1 is molecularly oriented biaxially, that is, in the axial and circumferential directions of the bottle, by draw-blow forming. As is seen from the enlarged section in FIG. 1, this bottle 1 has a multi-layer structure comprising an outer layer 9 composed of polyethylene terephthalate or a copolyester thereof, an inner layer 10 composed of polyethylene terephthalate or a copolyester thereof, and an intermediate layer 11 interposed between the two layers 9 and 10 and composed of an ethylene/vinyl alcohol copolymer having an ethylene content lower than 50 mole%. Adhesive layers 12a and 12b composed of a copolymer nylon resin or nylon resin blend, described in detail hereinafter, are interposed between the outer layer 9 and intermediate layer 11 and between the intermediate layer 11 and inner layer 10, respectively.

Adhesive

In the present invention, a copolymer nylon resin or a blend of a plurality of nylon resins is used as the above-mentioned adhesive. As the adhesive, there can be mentioned, for example, a 6/6,6 copolymer nylon (copolyamide), various copolyamides, and blends of a plurality of nylon resins.

More specifically, there can be mentioned copolyamides comprising plural kinds of amide recurring units, for example, those represented by the following formula:

    (1)

or

    (2)

wherein R, R$^1$ and R$^2$ stand for a linear alkylene group, and blends comprising a plurality of nylon resins having the above amide recurring units. In view of the gas-barrier property to oxygen, carbon dioxide gas or the like, it is preferred that a copolyamide having 3 to 30 amide groups, especially 4 to 25 amide groups, per 100 carbon atoms of the copolyamide or a blend of such polyamides be used as the adhesive. As preferred examples of polyamide units, there can be mentioned units of polycapramide (nylon 6), poly-ω-aminoheptanoic acid (nylon 7), poly-ω-aminononanoic acid (nylon 9), polyundecanamide (nylon 11), polylauryl lactam (nylon 12), polyethylenediamineadipamide (nylon 2,6), polytetramethyleneadipamide (nylon 4,6), polyhexamethyleneadipamide (nylon 6,6), polyhexamethylenesebacamide (nylon 6,10), polyhexamethylenedodecamide (nylon 6,12), polyoctamethyleneadipamide (nylon 8,6), polydecamethyleneadipamide (nylon 10,6) and polydodecamethylenesebacamide (nylon 10,8).

As specific examples of preferred copolyamides, there can be mentioned a caprolactam/lauryl lactam copolymer, a caprolactam/hexamethylene diammonium adipate copolymer, a lauryl lactam/hexamethylene diammonium adipate copolymer, a hexamethylene diammonium adipate/hexamethylene diammonium sebacate copolymer, an ethylene diammonium adipate/hexamethylene diammonium adipate copolymer and a caprolactam/hexamethylene diammonium adipate/hexamethylene diammonium sebacate copolymer.

So-called blends of homopolyamides or copolyamides having amide recurring units as described above may be used. For example, a blend of polycaprolactam and polyhexamethyleneadipamide and a blend of polycarolactam and a caprolactam/hexamethylene diammonium adipate copolymer can be used for attaining the objects of the present invention.

Furthermore, aromatic polyamides containing in the molecule chain at least 70 mole% of structural units formed from m-xylylene diamine or a mixed xylylene diamine comprising m-xylylene diamine and up to 30%, based on the total mixed xylylene diamine, of p-xylylene diamine and an α,ω-aliphatic dicarboxylic acid having 6 to 10 carbon atoms, as disclosed in Japanese Patent Publication No. 1156/75, No. 5751/75, No. 5753/75 or No. 10196/75 or Japanese Patent Application No. 29697/75, can be used as an adhesive for bonding a polyester layer and an ethylene-vinyl alcohol copolymer, though aromatic polyamides of this type are slightly inferior to the above-mentioned aliphatic polyamides in the moldability.

The molecular weight of the copolyamide or the blend-constituting polyamide is not particularly critical, so far as it is in the film-forming range. However, it is generally preferred that the relative viscosity ($\eta$ rel) of the polymer be 1.8 to 3.5 as measured at 20° C. with respect to a solution of 1 g of the polymer in 10.0 cc of 98% sulfuric acid. When a polyamide having this relative viscosity lower than 1.8 is used, it is often difficult to provide a laminate structural excellent in the mechanical strength of the adhesive layer. A polyamide having this relative viscosity higher than 3.5 is ordinarily inferior in the melt-moldability.

It has been found that a copolymer nylon of nylon 6 and nylon 6,6 is especially suitable for attaining the objects of the present invention.

More specifically, various copolyamide adhesives are almost satisfactory for bonding a thermoplastic polyester and an ethylene/vinyl alcohol copolymer, but they are still insufficient in that when contents are filled in formed multi-layer vessels and they undergo falling shocks, many mesh-like clefts or openings are formed in the adhesive layers and the appearance characteristics of the vessels are drastically degraded and the vessels become insufficient in the strength. The reason has not been completely elucidated, but it is considered that since most of copolyamide type adhesives are low in the cohesive force and the copolyamide type adhesives cannot follow up with the difference of the elastic deformation (elongation and contraction) between the polyester layer and the ethylene/vinyl alcohol copolymer layer under shocks or impacts, mesh-like clefts will be readily formed. In contrast, the above-mentioned nylon 6/nylon 6,6 copolymer preferably used in the present invention has an exceptionally large cohesive force as the copolyamide, and this copolyamide has such characteristic physical properties as shown below. The corresponding physical properties of nylon 6 and nylon 6,6 are also shown below.

|  | Nylon 6 | Nylon 6,6 | Nylon 6/ Nylon 6,6* |
|---|---|---|---|
| Tensile strength (kg/cm$^2$, ASTM D-638) | 645 | 765 | 575 |
| Tensile elongation (%, ASTM D-638) | 70 | 50 | 850 |
| Elastic modulus (kg/cm$^2$, ASTM D-638) | 18750 | 28100 | 14200 |
| Impact strength (ft · lb/m$^2$, ASTM D-256) | 1.3 | 1.5 | 11.0 |
| Melting point (°C., DSC method) | 215 | 260 | 167 |

Note
*copolymer nylon comprising 78 mole % of nylon 6 component and 22 mole % of nylon 6,6 component In connection with the ratio between nylon 6 and nylon 6,6 in the copolyamide, it is preferred that the content of the nylon 6 component be 50 to 93 mole%, especially 70 to 90 mole%, and the content of the nylon 6,6 component be 7 to 50 mole%, especially 10 to 30 mole%.

The bonding strength of the adhesive between the polyester layer and the ethylene/vinyl alcohol copolymer layer includes not only a strong bonding force but also a broad width for the necessary bonding force.

Generally, it is required that the peel strength should be 20 to 800 g/20 mm of the width.

In case of ordinary polyamide adhesives, the bonding force to the ethylene/vinyl alcohol copolymer layer is stronger and the bonding force to the polyester layer is relatively weak. However, in case of a nylon 6/nylon 6,6 copolymer, even the bonding force to the polyester layer is strong.

When the polyamide type adhesive of the present invention is used, the transparency of the polyethylene terephthalate substrate layer is not degraded if the thickness of the adhesive layer is about 5μ to about 50μ. On the other hand, when maleic acid-modified polyolefins such as maleic acid-modified polypropylene and acid-modified polyethylene are used as the adhesive for bonding polyester and ethylene/vinyl alcohol copolymer layers, the transparency is considerably degraded.

Other Constituent Materials

Known polyethylene terephthalate is optionally used as the polyester (PET), and it is sufficient if polyethylene terephthalate has a film-forming molecular weight. A polyester having an intrinsic viscosity of at least 0.8, especially at least 1.0, is preferably used. As the copolyester, there is used a copolyester composed mainly of ethylene terephthalate units, which contains minor amounts of ester units in which at least one of the acid and alcohol components is an acid component other than terephthalic acid or an alcohol component other than ethylene glycol. Since this copolyester is composed mainly of ethylene terephthalate units, the copolyester can be subjected to draw-blow forming and molecularly oriented under the same conditions as those adopted for polyethylene terephthalate. Moreover, since the copolyester contains ester units other than ethylene terephthalte units, the crystallization speed of the copolyester is lower than that of polyethylene terephthalate.

As the acid component other than terephthalic acid in the copolyester, there can be mentioned isophthalic acid, naphthalene-dicarboxylic acid, diphenyldicarboxylic acid, 2,2-bis(4-carboxyphenyl)propane, bis(4-carboxyphenyl)methane, cyclohexane-dicarboxylic acid (hexahydroterephthalic acid or hexahydroisophthalic acid), adipic acid, sebacic acid, succinic acid and dodecane-dicarboxylic acid. As the alcohol component other than ethylene glycol, there can be mentioned propylene glycol, butane-diol, neopentyl glycol, hexane-diol, glycerol, diethylene glycol, triethylene glycol, tetraethylene glycol, dibutylene glycol and tributylene glycol. These acid components and/or alcohol components may be used singly or in the form of mixtures of two or more of them.

In the present invention, also improvement of the gas-barrier property of a polyester vessel is intended, and among vinyl alcohol type resins, as ethylene/vinyl alcohol copolymer (EVOH) having an ethylene content lower than 50 mole% is especially selected and used. As is well-known, polyvinyl alcohol is not heat-moldable unless it is subjected to a special treatment, and in ethylene/vinyl alcohol copolymers, increase of the ethylene content results in reduction of the melting property and increase of the thermoplastic property. Therefore, use of an ethylene/vinyl alcohol copolymer having a lower melting point and a lower drawing-possible temperature will be ordinarily considered to be preferable. However, in the present invention, an ethylene/vinyl alcohol copolymer having a high melting point and a high drawing-possible temperature is selected. The first reason is that in case of an ethylene/vinyl alcohol copolymer having an ethylene content higher than 50 mole%, although co-drawing of this copolymer with a polyester resin layer is advantageous because the melting point is low and the drawing-possible temperature is low, the gas-barrier property is abruptly decreased with increase of the ethylene content and lamination of the polyester resin with the ethylene/vinyl alcohol copolymer becomes insignificant. The second reason is that according to the present invention, it has been found that, as described in detail hereinafter, even an ethylene/vinyl alcohol copolymer having a high vinyl alcohol content can be drawn in the form of a multi-layer structure with a polyester resin at a drawing temperature suitable for drawing of the polyester resin. Therefore, an ethylene/vinyl alcohol copolymer having an ethylene content lower than 50 mole%, that is, a higher vinyl alcohol content, is selected and used as the ethylene/vinyl alcohol copolymer to be laminated with a polyester resin.

In the present invention, an ethylene/vinyl alcohol copolymer obtained by saponifying a copolymer of ethylene with a vinyl ester such as vinyl acetate is used. In view of the moldability and gas-barrier property, an ethylene/vinyl alcohol copolymer having an ethylene content of 15 to 50 mole%, especially 25 to 45 mole%, and a saponification degree of at least 96% is advantageously used. The molecular weight of the copolymer is not particularly critical, so far as the copolymer has a film-forming property.

It is preferred that the thickness ratio of the polyester layer to the ethylene/vinyl alcohol copolymer layer be in the range of from 2/1 to 30/1, especially from 4/1 to 15/1. Furthermore, it is preferred that the thickness ratio of the outer polyester layer to the inner polyester layer be in the range of from 1/1 to 5/1, especially from 2/1 to 3/1. It must be noted that the present invention includes an embodiment in which the thickness of the outer polyester layer is increased and the thickness of the inner polyester layer is decreased so that cooling of the inner layer is promoted and accelerated. Moreover, it is preferred that the thickness ratio of the polyester layer to the adhesive layer be in the range of from 5/1 to 100/1, especially from 10/1 to 50/1.

Forming Method

In the present invention, there is advantageously adopted a method in which a pipe having the above-mentioned multi-layer structure is formed by co-extrusion, the pipe is formed into a bottomed preform and the bottomed preform is subjected to draw-blowing, or a method in which the above-mentioned resins are formed into a cylindrical or pot-shaped multi-layer preform by co-injection and the preform is subjected to draw-blowing.

Moreover, there may be adopted a method in which a sheet having the above-mentioned multi-layer structure is formed by co-extrusion, the sheet is punched into a disc and the disc is formed into a drawn cup by plug assist forming, air-pressure forming, overhang forming or forging.

In short, it is sufficient in the present invention if the inner and outer polyester layers 9 and 10 constituting the barrel portion 7 are molecularly oriented in at least one axial direction. According to the above-mentioned draw-blowing forming method, these layers are molecularly oriented biaxially in the axial direction and hoop direction, and according to the drawn cup-forming method, these layers are molecularly oriented in the radial direction or the direction of the axis of the vessel.

The polyamide type adhesive used in the present invention is advantageous in that the polyamide type adhesive can be drawn or stretched at a polyester-drawing temperature and shows a strong interlaminar adhesion.

The present invention will now be described in detail with reference to the following examples that by no means limit the scope of the invention.

EXAMPLE 1

A multi-layer pipe was formed by co-extrusion by using a homopolymer of ethylene terephthalate (PET), an ethylene/vinyl alcohol copolymer (EVOH) having an ethylene content of 30 mole% and a vinyl alcohol content of 70 mole% and a copolymer of nylon 6 and nylon 6,6 (copolymer having a nylon 6,6 content of 22 mole% and a nylon 6 content of 78 mole%) as an adhesive (AD), and after formation of a bottom neck, the pipe was preliminarily heated at 100° C. and draw-blown to obtain a bottle having an inner volume of 1500 ml and a weight of 59 g.

The PET (outer layer)/AD/EVOH/AD/PET (inner layer) thickness ratio in the formed pipe was 10/0.2/1/0.2/5 (AD indicates the adhesive layer).

The properties of the so-obtained bottle were as follows.

The transparency characteristics of the barrel portion of the bottle were as shown below.

| | Present Invention | Comparison (single layer of PET) |
| --- | --- | --- |
| Total ray transmission (%) | 88.7 | 88.8 |
| Diffusion transmission (%) | 1.2 | 0.9 |
| Haze | 1.4 | 1.1 |
| Sample thickness (mm) | 0.33 | 0.32 |

The falling test was carried out in the following manner.

Water was filled in the sample bottle so that the level of water was slightly lower than the eye level, and sodium bicarbonate and citric acid were added to water so that the gas volume was 4.0. The bottle was allowed to stand still at room temperature for 24 hours and was dropped on a concrete floor from a height of 2 m vertically or horizontally. Cracking and interlaminar peeling were checked. The obtained results are shown below.

| | Present Invention | Comparison (single PET layer) |
| --- | --- | --- |
| 2 m Vertical Falling | | |
| cracking | not observed | not observed |
| delamination | not observed | — |
| 2 m Horizontal Falling | | |
| cracking | not observed | not observed |
| delamination | not observed | — |

The oxygen permeability $QO_2$ of the bottle of the present invention was found to be 1.2 cc/m$^2$.day.atm as measured at 37° C., while the oxygen permeability $QO_2$ of the comparative bottle (single PET layer) was found to be 5.9 cc/m$^2$.day.atm as measured at 37° C.

COMPARATIVE EXAMPLE 1

A bottle was prepared in the same manner as described in Example 1 except that the copolyamide adhesive was not used. Namely, the bottle had a PET/EVOH/PET layer structure in which the PET/EVOH/PET thickness ratio was 10/1/5. The shape, inner volume and weight of the bottle were the same as those of the bottle prepared in Example 1.

The falling test of this comparative bottle was carried out in the same manner as described in Example 1. It was found that in either vertical falling or horizontal falling, delamination was caused along the entire surface of the bottle.

The oxygen permeability $QO_2$ of this comparative bottle was found to be 4.8 cc/m$^2$.day.atm as measured at 37° C.

We claim:

1. A process for the preparation of a multi-layer gas-barrier drawn polyester bottle, which comprises (i) forming by co-extrusion a multi-layer pipe comprising (a) outer and inner layers of polyethylene terephthalate, (b) a gas-barrier intermediate layer of an ethylene-vinyl alcohol copolymer having an ethylene content of 15 to 50 mole % and (c) adhesive layers interposed between the gas-barrier intermediate layer and each of the outer and inner layers, each of said adhesive layers consisting of a nylon 6/nylon 6,6 copolymer having a nylon 6 content of 50 to 93 mole % and having a relative viscosity ($\eta$ rel) of 1.8 to 3.5 as measured at 20° C. with respect to a solution of 1 gram of the polymer in 10 cc of 98% sulfuric acid, and the copolyamide adhesive having such characteristics that the peel strength between the polyethylene terephthalate layer and the ethylene-vinyl alcohol copolymer layer is 20 to 800 g/20 mm of the width in the state of a bottle, (ii) forming a neck portion at one end of the multi-layer pipe and forming a bottom at another end of the multi-layer pipe to form a bottomed preform, and (iii) draw-blowing the bottomed preform to form a bottle molecularly oriented biaxially in the axial direction and hoop direction.

2. A process as set forth in claim 1, wherein the adhesive layer has a thickness in the range from about 5 microns at about 50 microns.

3. A process as set forth in claim 1, wherein the ethylene/vinyl alcohol copolymer gas-barrier intermediate layer has an ethylene content of from 15 to 50 mole % and a saponification degree of at least 96%.

4. A process as set forth in claim 1, wherein the ethylene/vinyl alcohol copolymer gas-barrier intermediate layer has an ethylene content of from 25 to 45 mole % and a saponification degree of at least 96%.

5. A multi-layer gas-barrier drawn polyester vessel, which comprises an open end portion, a barrel portion which is molecularly oriented in at least one axial direction and a closed bottom portion, said vessel having a multi-layer structure comprising (a) outer and inner layers of polyethylene terephthalate, (b) a gas-barrier intermediate layer of an ethylene-vinyl alcohol copolymer having an ethylene content of 15 to 50 mole % and (c) adhesive layers interposed between the gas-barrier intermediate layer and each of the outer and inner layers, each of said adhesive layers consisting of a nylon 6/nylon 6,6 copolymer having a nylon 6 content of 50 to 93 mole % and having a relative viscosity ($\eta$ rel) of 1.8 to 3.5 as measured at 20° C. with respect to a solution of 1 gram of the polymer in 10 cc of 98% sulfuric acid, and the copolyamide adhesive having such characteristic that the peel strength between the polyethylene terephthalate layer and the ethylene-vinyl alcohol copolymer layer is 20 to 800 g/20 mm of the width.

* * * * *